United States Patent [19]

Celikkaya

[11] Patent Number: 5,474,583
[45] Date of Patent: Dec. 12, 1995

[54] ABRASIVE GRAIN WITH METAL OXIDE COATING, METHOD OF MAKING SAME AND ABRASIVE PRODUCTS

[75] Inventor: Ahmet Celikkaya, Woodbury, Minn.

[73] Assignee: Minnesota Mining and Manufacturing Company, St. Paul, Minn.

[21] Appl. No.: 209,602

[22] Filed: Mar. 11, 1994

Related U.S. Application Data

[63] Continuation of Ser. No. 115,351, Sep. 1, 1993, abandoned, which is a continuation of Ser. No. 920,834, Jul. 28, 1992, abandoned.

[51] Int. Cl.$^6$ .................................................. C09C 1/68
[52] U.S. Cl. ........................................ 51/309; 51/295
[58] Field of Search ............................. 51/293, 295, 309

[56] References Cited

U.S. PATENT DOCUMENTS

| | | | |
|---|---|---|---|
| 1,528,543 | 3/1925 | Hartmann | 51/316 |
| 1,910,444 | 5/1933 | Nicholson | 51/308 |
| 2,314,340 | 3/1943 | Brown et al. | 51/295 |
| 2,527,044 | 10/1950 | Walton et al. | 51/308 |
| 3,029,160 | 4/1962 | Van Der Beck, Jr. | 117/100 |
| 3,269,815 | 8/1966 | Koopman | 51/308 |
| 4,249,913 | 2/1981 | Johnson et al. | 51/295 |
| 4,252,544 | 2/1981 | Takahashi | 51/309 |
| 4,278,449 | 7/1981 | Helletsberger et al. | 51/309 |
| 4,311,489 | 1/1982 | Kressner | 51/298 |
| 4,314,827 | 2/1982 | Leitheiser et al. | 51/298 |
| 4,472,173 | 9/1984 | Bruning et al. | 51/298 |
| 4,518,397 | 5/1985 | Leitheiser et al. | 51/293 |
| 4,623,364 | 11/1986 | Cottringer et al. | 51/309 |
| 4,652,275 | 3/1987 | Bloecher et al. | 51/298 |
| 4,734,104 | 3/1988 | Broberg | 51/295 |
| 4,737,163 | 4/1988 | Larkey | 51/295 |
| 4,744,802 | 5/1988 | Schwabel | 51/309 |
| 4,770,671 | 9/1988 | Monroe et al. | 51/293 |
| 4,881,951 | 11/1989 | Wood et al. | 51/309 |
| 4,913,708 | 4/1990 | Kalinowski | 51/295 |
| 4,964,883 | 10/1990 | Morris et al. | 51/293 |
| 4,997,461 | 3/1991 | Markhoff-Matheny et al. | 51/295 |
| 5,009,674 | 4/1991 | Kunz et al. | 51/295 |
| 5,009,675 | 4/1991 | Kunz et al. | 51/295 |
| 5,011,508 | 4/1991 | Wald et al. | 51/293 |
| 5,042,991 | 8/1991 | Kunz et al. | 51/307 |
| 5,085,671 | 2/1992 | Martin et al. | 51/293 |
| 5,102,429 | 4/1992 | Wald et al. | 51/295 |
| 5,131,923 | 7/1992 | Markhoff-Matheny et al. | 51/293 |
| 5,131,926 | 7/1992 | Rostoker et al. | 51/309 |
| 5,164,348 | 11/1992 | Wood | 501/127 |
| 5,213,591 | 5/1993 | Celikkaya et al. | 51/293 |

FOREIGN PATENT DOCUMENTS

| | | |
|---|---|---|
| 0293163A2 | 11/1988 | European Pat. Off. . |
| 0394213A1 | 10/1990 | European Pat. Off. . |
| 2-97457 | 4/1990 | Japan . |
| 2097457 | 4/1990 | Japan ............ C04B 35/10 |

OTHER PUBLICATIONS

Japanese Abstract No. JP–4305052, Mitsubishi Materials Corp.

"Preparation of Zirconia–Alumina Powders by Zirconium Alkoxide Hydrolysis," Fegley et al., *J. Am. Ceram. Soc.*, 68 [2] C–60–C–62 (1985).

*Primary Examiner*—Deborah Jones
*Attorney, Agent, or Firm*—Gary L. Griswold; Walter N. Kirn; Gregory D. Allen

[57] ABSTRACT

A method of preparing preferred abrasive grain material is provided. The method involves steps of coating a non-sintered aluminum base particles with a metal alkoxide containing coating; heating to convert the coating to a metal oxide coating; and then sinter the base particles to provide sintered particles having an alpha-alumina-based core with an autogenously bonded metal oxide coating. The invention also concerns improved abrasive grain materials and abrasive products including the improved abrasive grain materials therein.

18 Claims, 2 Drawing Sheets

ABRASIVE GRAIN WITH METAL OXIDE COATING, METHOD OF MAKING SAME AND ABRASIVE PRODUCTS

This is a continuation of application Ser. No. 08/115,351 filed Sep. 1, 1993, now abandoned which is a continuation of Ser. No. 07/920,834 filed Jul. 28, 1992 now abandoned.

TECHNICAL FIELD

The present invention relates to improved abrasive grains, in particular, alpha-alumina-based ceramic abrasive grains. The invention further concerns methods of preparing improved abrasive grains and abrasive products which contain improved grains.

BACKGROUND OF THE INVENTION

The abrasives industry generally concerns abrasive products comprising a binder and a plurality of abrasive grains. During abrasion, the abrasive grains are brought into contact with a work surface generally at a considerable pressure and with development of a substantial amount of heat. It is important for such operations that the abrasive products securely retain the abrasive grains. That is, generally, premature release of the abrasive grains from the abrasive products is to be avoided.

A variety of abrasive products are known, including coated abrasive products, bonded abrasives and nonwoven abrasives. Generally, premature release of abrasive grains has been a problem with respect to all of the various types of abrasive products. The problem is particularly significant when the abrasive product is used for high stock removal applications. During such uses, the abrasive product must be able to withstand high pressures and rotative speeds, while still providing a good, sufficient abrasive cut. For example, a coated abrasive disk may traverse 12,000 revolutions per minute (rpm) and be subjected to an interface pressure as high as 15 kg/cm$^2$. Such severe conditions may be preferred for certain applications as they result in increased cut rates. However, they severely tax the integrity of the bond between the abrasive grain and the binder (adhesive) system. If the bond at this interface fails, the abrasive grains are ejected (or shelled) from the abrasive product.

In the coated abrasive industry, the term "shelling" is sometimes utilized to refer to the phenomenon of premature abrasive grain release from binder, in use. Generally, the term "shelling" is applied whether the product involved is a coated abrasive or some other form of abrasive product, such as a bonded abrasive or nonwoven abrasive. Herein, the term "shelling" is meant to refer in general to premature release of abrasive grains from a binder system (or bond system) without regard to type of construction or substrate involved.

SUMMARY OF THE INVENTION

According to the present invention a method of preparing ceramic abrasive grain material is provided. The ceramic grain material comprises sintered particles useable as abrasive grain in abrasive products.

The method generally comprises steps of (a) providing a mass of particles comprising alpha-alumina precursor material each particle of which is sinterable to an alpha-alumina-based abrasive particle of said abrasive grain;

(b) coating said particles with a coating composition comprising metal alkoxide to provide coated particles, said coating being capable of converting to a metal oxide coating which is autogenously bonded to the surface of each of said particles upon heating; and (c) heating said coated particles under conditions which convert said coating to a metal oxide coating and sinter said particles.

In general, the conversion is conducted through steps of hydrolysis to form metal hydroxide(s) and then reaction, to form metal oxide. The product, from the step of converting the metal alkoxide-containing coating on the base particles to a metal oxide coating, is then heated to a temperature and for a time sufficient to provide sintered alpha alumina abrasive particles having autogenously bond thereto a metal oxide coating.

Preferably the base particles utilized in processes according to the present invention are alumina precursors, formed from a sol gel process as described herein. Preferably, the step of converting the metal alkoxide-containing coating to a metal oxide coating concerns a first step of hydrolyzing the metal-alkoxide to metal hydroxide and a second step of metal hydroxide reaction to form a metal oxide. The step of hydrolysis is conducted with atmospheric moisture and/or residual moisture in the base grit particles, either absorbed from the atmosphere or left over from the sol gel process or other processing, for example impregnation. Preferably the step of converting the metal hydroxide to metal oxide is completed through application of substantial heat, typically greater than 400° C., to the coated base grit particles. Conventional means may be utilized to achieve sintering.

In certain preferred applications of processes according to the present invention, the base particles may be modified prior to application of the metal alkoxide containing coating thereto. Such modification generally involves provision within the base particles of metal oxides (modifier) or metal oxide precursors (modifier precursor).

A variety of materials may be utilized as the metal alkoxide, in the metal alkoxide-containing coating. For example, various metal cations may be utilized in the alkoxide. Zirconium will be preferred for certain applications, i.e. those in which the abrasive grains are to be utilized for stainless steel grinding. However, in some applications alkoxides of titanium, aluminum, magnesium, zinc, cobalt, nickel, silicon, hafnium, iron, manganese, chromium, yttrium, praseodymium, samarium, ytterbium, neodymium, lanthanum, gadolinium, cerium, dysprosium, erbium and mixtures of two or more thereof may be desired. For purposes of this disclosure, silica is defined as a metal oxide and an alkoxide of silica is a metal alkoxide.

The following is a preferred formula for the metal alkoxides:

Formula I wherein:

M is a metal cation;

n is the oxidation state of M;

x is an integer having a value of 0 to n−1;

OR is an alkoxy group, wherein O is oxygen;

each R group is an alkyl group; and, each Z group is independently an organic group or inorganic group.

In general, what is required is an alkoxide which is a precursor to a metal hydroxide and metal oxide as described.

A variety of alkoxides, having a variety of R groups therein may be utilized. That is, the R group of each alkoxy group on the metal may be of a variety of formulae. In general, each R group is an organic group that may be branched or linear, it may have non-interfering substituents thereon. In general, organic groups of 1–20 carbon atoms are preferred with greater preference for R groups of 3–6 carbon atoms. Since in typical processes according to the present invention the alkoxy group yields a by-product, i.e. alcohol, relatively simple (non-substituted, 3–6 carbon atoms) organic groups will be preferred. If the metal alkoxide includes more than one alkoxy group thereon, each alkoxy group may be the same or selected independently of other alkoxy groups in the material.

The metal atom may include one or more organic or inorganic groups bonded directly thereto. Similarly to the organic groups in the alkoxy groups, there is no specific limitation on the nature of any organic group or inorganic group bonded directly to the metal, except that it be non-interfering with formation of a desired coating. If the metal atom includes more than one inorganic or organic group thereon, each may be the same or selected independently of the others. The metal atom may include both organic and inorganic groups thereon.

A variety of methods, including spray coating, dip coating, fluidized bed coating, etc. may be utilized to apply the metal alkoxide containing coating to the base grit particles. In general, methods involving spray coating will be preferred, since the use of excess coating solution can be readily avoided.

Preferably sufficient metal alkoxide-containing coating is provided on the base grits to yield a final sintered product having a metal oxide coating covering at least 50% of the base particle outer surface area.

The present invention includes within its scope ceramic abrasive grain material made according to the preferred processes as described. In general, preferred abrasive grain materials according to the present invention comprise sintered particles having an average particle size within the range of about 20 micrometers to about 4000 micrometers, each particle having an alpha-alumina based core (resulting from the sintering of alumina based precursor base particle); and, a metal oxide coating autogenously bonded to the alpha-alumina based core. The term "autogenously bonded" in this context means that the surface coating is bonded to the underlying ceramic core without any type of external bonding medium such as flux, vitreous bonding material, organic binder, glass or the like. Rather, bonding of the metal oxide coating is a result of binder-free adhesion between the sintered base grit and the sintered coating.

The metal oxide coating may be continuous or discontinuous. In general the metal oxide coating will comprise randomly shaped metal oxide islands of about 5–50 micrometers in length (greatest dimension) and less than about 5 micrometers thick. It is also observed that typically minute spheres or sphericules which are much smaller in size than the islands of metal oxide will be present, both on the metal oxide islands and therebetween.

The invention also includes within its scope abrasive products having improved abrasive grains according to the present invention therein. Such products may include materials having abrasive grains bonded to a substrate such as paper; materials having abrasive grains bonded within a non-woven fibre substrate; and, materials in which the abrasive grains are bonded in a preferred shape, such as a grinding wheel or cutoff wheel.

The drawings constitute part of the specification, and depict various embodiments. In some of the drawings relative component sizes or material thicknesses may be shown exaggerated, to facilitate an understanding of the principles of the invention.

DETAILED DESCRIPTION OF THE PREFERRED EMBODIMENT

The present invention pertains to ceramic abrasive grains, each of which includes an alpha-alumina-based core having a metal oxide surface coating. The metal oxide coating is securely bonded to the surface of the alpha-alumina-based core, thereby providing increased surface area to each abrasive particle of the abrasive grain. Although not wanting to be bound by theory, increased surface area is believed to relate to improved adhesion between the abrasive grain and a binder.

Herein the term "abrasive grain" and variants thereof will be used to refer to the granular abrasive material after it has been prepared for inclusion in an abrasive product. The term "base particle" will be used to refer to ceramic particle precursor which, when sintered, can provide abrasive grain.

The Base Particle

Preferred base particles for utilization in processes according to the present invention are porous unsintered particles which are prepared according to a sol-gel process, for example as disclosed in U.S. Pat. Nos. 5,011,508; 4,881,951; 4,770,671; 4,744,802; 4,623,364; 4,574,003; 4,518,397; and 4,314,827, the disclosures of which are incorporated herein by reference.

To prepare alumina base particles by a sol-gel process, a dispersion comprising from about 2 to about 60 wt-% alpha-aluminum oxide monohydrate (typically boehmite) is formed, although other hydrates may be used. The weight % is based on a total of hydrate plus liquid carrier, without regard to adjuvants or additives. The boehmite can be prepared from any of various conventional techniques or it can be acquired commercially. Commercially available boehmite usable in sol-gel processes as described herein include: Disperal®, available from Condea Chemie, GMBH, and Catapal®, available from Vista Chemical Co. The typical and preferred liquid carrier is water, preferably deionized water.

A peptizing agent may be used in the boehmite dispersion, to produce a more stable hydrosol or colloidal dispersion. Monoprotic acids which may be used as the peptizing agent include acetic, hydrochloric, formic, and nitric acids. Nitric acid is the preferred peptizing agent. Multiprotic acids are normally to be avoided since they rapidly gel the dispersion, making it difficult to handle or mix in additional components. Some commercial sources of boehmite contain an acid titer (such as acetic, formic, or nitric acid) to assist in forming a stable dispersion. Such materials may be utilized in processes according to the present invention.

The dispersion may contain a precursor or modifying additive which can be added to enhance some desired property of the fired product or to increase the effectiveness of a subsequent processing step, such as sintering. Such modifiers are generally introduced in the form of a modifier precursor as a salt (typically a metal salt material) soluble in the liquid carrier of the dispersion, and thus typically comprise water soluble salts. Mixtures of modifiers may be utilized. Water soluble salts comprising metal salt precursors of the oxides of magnesium, zinc, cobalt, nickel, zirconium, hafnium, iron, manganese, chromium, yttrium, praseodymium, samarium, ytterbium, neodymium, lanthanum, gadolinium, cerium, dysprosium, erbium, titanium and mixtures of these materials are usable modifiers. Exact proportions of these components present in the dispersions (for base particle formation) are not critical to the principles of the present invention and thus can be varied to convenience.

The dispersion may contain a nucleating agent to enhance the transformation to alpha-alumina. Suitable nucleating agents include fine particles of alpha-alumina, alpha-ferric oxide, or its precursor (disclosed in U.S. Pat. No. 4,744,802, incorporated herein by reference) titanates (disclosed in U.S. Pat. No. 5,076,815, incorporated herein by reference), chromia (disclosed in U.S. Ser. No. 07/552,489, now U.S. Pat. No. 5,219,806, incorporated herein by reference), and any other material which will nucleate the transformation. The amount of nucleating agent used should be sufficient to effect nucleation.

The dispersion can be formed by any suitable means. For example, the dispersion can be formed by simply mixing the aluminum oxide monohydrate with water containing a peptizing agent (and modifier if used); or, by forming an aluminum oxide monohydrate slurry to which the peptizing acid is added. Once the dispersion is formed, it is then gelled and dried (i.e., dewatered). The gel can be formed by any conventional technique such as the addition of a dissolved or dispersed metal-containing modifying additive, for example, magnesium nitrate. The pH of the dispersion affects how fast the dispersion will gel. Typically, the pH should be in the range of about 1.5 to 4. In general, the lower the pH, the higher the rate of gelation.

Shaping of the gel may be accomplished by conventional means such as pressing, molding, casting extrusion or cutting (or combination of those steps), with air drying. Shaping may be done in steps, for example, by first forming a plastic mass of the partially dried dispersion by extrusion. Examples of shaped abrasive grains include rods, spheres, triangles, pyramids, etc. Irregularly shaped grits and abrasive grain products are conveniently formed by depositing the dispersion in any convenient size and shape of drying vessel (for example a pan-shaped vessel) and drying, typically at a temperature below the frothing temperature of the dispersion.

Air drying steps may be used, as well as various dewatering methods, for removal of free water from the dispersion or gel (or from the shaped and partially dried dispersion). Drying can be accomplished in a forced air oven at a temperature in the range of about 50° C. to about 200° C., preferably between about 100° C. and 150° C. Generally, the drying is conducted until the product contains 1–40%, preferably 5–20%, by weight-free water. To inhibit frothing, drying is typically conducted with a slow increase in temperature up to the ranges stated.

After the dispersion has been dried or dewatered, if particle size reduction is needed, the dried dispersion can be converted into base particles by crushing (e.g., by hammer milling, ball milling, or roll crushing). If the dispersion is shaped, the shaped particles are then the base particles. Any method of comminuting the solid can be used and the term "crushing" is meant to refer to any such method. In general, a wide variety of particle sizes, e.g., about 0.1 micrometer about 4 millimeters, (preferably about 20 micrometers to about 4,000 micrometers) may be used as base particles. Generally a selected size range is isolated for any given use. Classification steps such as screening may be used to obtain selected particle sizes or size fractions. It is noted that subsequent sintering generally leads to particle shrinkage, on the order of 33% of linear dimension. This should be taken into consideration during fraction selection.

The crushed (or shaped) material may in some instances comprise the base particles. In other instances, the crushed (or shaped) material will comprise a "precursor", the base particles being formed by calcining the crushed (or shaped) material. In typical applications, it will be preferred to calcine the base particles to remove water, prior to sintering.

During calcining, essentially all the volatiles are removed from the precursor. Also, any modifiers retained within the precursor are transformed to a metal oxide during the calcining process. During calcining, the base particles are generally heated to a temperature between about 400° C. and about 1000° C., preferably 400° C. to 800° C. The base particles are held within this temperature range until an appropriate amount of free water and preferably over 90 wt-% of any bound volatiles are removed.

Conversion of Base Particles to Improved Abrasive Grains

According to the present invention, base particles are converted into improved abrasive grains through application of one or more treatments. In order to improve the surface of the base particles with respect to adhesion to a binder, the base particles are provided with a metal oxide coating. In order to improve the physical properties of the base particles, for example to increase density and toughness, the base particles may be impregnated with various modifier precursors as described above. Further, a nucleating agent can be provided to the base particles after their formation. The base particles may be treated by more than one of the above described treatments.

A. Impregnation of the Base Particles with Modifier

General methods of impregnating calcined particles with modifiers and modifier precursors are described in U.S. patent application Ser. No. 07/799,867, filed Nov. 27, 1991, now U.S. Pat. No. 5,164,348 incorporated herein by reference. Such methods may be applied to precursor particles according to the present invention, prior to coating of the particles with alkoxide(s) as described herein, to provide the particles with modifiers discussed previously.

Impregnation generally involves mixing the base particles or base particle precursor with a liquid carrier having the modifier precursor (metal salt precursor to a metal oxide) dissolved therein. Preferably enough liquid carrier (typically 50–60 mL of liquid per 100 grams of base particle material if made according to preferred process described) is used to substantially saturate the particle material (i.e. introduce liquid carrier in all pore volume in the particle material).

Modifiers and modifier precursors as described above for use in the sol-gel process may be used.

In general, the impregnated base particles will be coated with a metal oxide coating, as described hereinbelow, before they are sintered. In typical processes according to the present invention, it is not necessary to dry the impregnated base particles prior to the step of coating. However, impregnated particles may be dried and even calcined before coating, if desired.

B. Coating of the Base Particles

The improved abrasive grain according to the present invention is provided by applying a metal oxide coating onto a base particle. The metal oxide coated base particle provides an abrasive grain having an increased surface area. This increased surface area increases the surface area ratio for contact with a binding agent or adhesive.

Further, preferred metal oxide coatings of the present invention may provide the abrasive grain with improved abrading characteristics. For example, it is theorized that if the metal oxide coating is zirconia, the presence of the coating can act to inhibit "capping" of the abrasive grain during use, especially in stainless steel grinding. The term "capping" refers to a phenomenon of metal particles from the abraded workpiece becoming welded to tops of the abrasive grains. When the metal oxide coating is a zirconia coating, less capping is observed.

In general, the metal oxide coating is provided through a multi-step process including:

1. first coating base particles with a coating solution comprising a metal alkoxide; and,
2. secondly, treating the coated base particles such that the metal alkoxide is converted to a metal oxide.

Preferably, the metal alkoxide applied to the base particles, in a first step of coating formation, is of Formula I:

Formula I wherein:

x=an integer within the range of O to n−1 inclusive;

n=the oxidation state of the metal cation M;

O=oxygen;

R=an organic group, preferably as described hereinbelow;

Z=an organic or inorganic group bonded directly to the metal M, preferably as described hereinbelow; and, M=a metal cation.

If the metal alkoxide used has more than one Z group therein, (i.e. x is $\geq 2$), not all groups Z need be the same (i.e., they are independently selected). Also, if the metal alkoxide used has more than one R group therein (i.e. n−x is $\geq 2$), then not all groups R need be the same (i.e., they are independently selected). Also, mixtures of metal alkoxides according to Formula I may be used in processes according to the present invention.

The metal cation, M, may comprise any of a variety of metals including: zirconium, titanium, aluminum, magnesium, zinc, cobalt, nickel, silicon, hafnium, iron, manganese, chromium, ytterbium, praseodymium, samarium, ytterbium, neodymium, lanthanum, gadolinium, cerium, dysprosium, erbium, and combinations thereof. Zirconia coatings, which may be derived, for example, from zirconium alkoxides, are preferred if the resulting abrasive grains are to be used for stainless steel grinding. When such is the case, the zirconia is preferably in the tetragonal form. In the tetragonal form, as opposed to the monoclinic form, the zirconia tends to inhibit crack propagation and provide a tougher coating.

The R group may comprise any of a variety of organic groups. In general, if R comprises an organic group containing less than about 5 carbon atoms, the alkoxide will be relatively "fast reacting" as the term is used herein in this context. If R contains more than about 6 carbon atoms, the metal alkoxide will be relatively "slow reacting", as the term is used herein in this context. R may comprise an organic group of nearly any size; however, generally metal alkoxides containing R groups of no more than about 20 carbon atoms will be preferred. The groups R may be straight chain or branched. They may include various substituent groups therein; however, preferably they are such that they are non-interfering with the reactions to be conducted at the metal, in metal oxide coating formation. Preferred R groups comprise unsubstituted linear and branched alkyl groups of 3–8, more preferably 3–6, carbon atoms.

The group Z may generally comprise the same kind of groups as the R group. In addition, Z may be an inorganic group such as a halogen. Also, Z may include therein a substituent-reactive for forming bridging with metals, according to the present invention. For example, the Z group may comprise acetyl acetonate.

During coating processes according to the present invention, generally the coating solution comprises the metal alkoxide (or a mixture of metal alkoxides) and optionally an organic solvent. The preferred solvent is a non-polar organic solvent. Examples of such solvents include heptane, hexane, and cyclohexane. Polar solvents such as acetone, methyl ethyl ketone and lower molecular weight alcohols may, however, be utilized as long as they do not contain unacceptable amounts of water.

The organic solvent is used if the viscosity of the metal alkoxide(s) is sufficiently high so that good coating will not result in the absence of the solvent or if the metal alkoxide is crystalline. The viscosity of the coating solution should, generally, be less than about 1,000 centipoise, preferably less than 500 centipoise, and most preferably less than about 100 centipoise, as mesured using a Brookfield viscometer with a No. 2 spindle at 30 RPM and 25° C.

Metal alkoxides typically react with water to form metal hydroxides. The metal hydroxides may typically form metal-oxygen-metal-bridging with one another. If the group Z contains a moiety reactive with the metal, then there may be some metal-Z-metal bridging as well.

It is preferred that the coating solution be maintained relatively dry or water free during storage; i.e., prior to the step of coating. In this manner, premature hydrolysis of the metal alkoxide will be avoided or at least minimized. It is not meant by this that anhydrous conditions are required. In general, all that is required is that the coating solution be sufficiently dry for whatever period of storage life or handling prior to coating will be involved, without unacceptable amounts of hydrolysis and/or conversion to oxide. A variety of factors will be involved with respect to this, including the reactivity of the metal alkoxides involved. If less than 6 carbon atoms are present in the alkoxide groups "R", water may be a greater problem.

The coating solution may optionally contain additives such as wetting agents or dispersing agents, to facilitate coverage of the base particles. Additionally, the coating solution may comprise metal oxides or metal oxide precursors that will also react into the coating being formed on the base particle. These materials can be added in an amount effective to give the property desired.

If desired, the metal alkoxides can be modified with alcohols, acids, bases, chlorides and/or chelating agents to alter the reactivity of the resulting alkoxide(s) and the rate and path of hydrolysis.

In general, the metal oxide coating may be provided by covering or coating the outer surface of the base particles with the coating solution, and then converting the oxide precursor(s) with follow-up steps of conversion to metal oxide(s). It is not necessary to saturate the base particles with the coating solution. Preferably the base particles will not have been calcined prior to coating, so that the moisture in the base particle is available to facilitate hydrolysis.

In general, the base particles may be coated by any of a variety of techniques including in an air mixer, with a spray dryer, by spray coating or in a tumbler. The preferred method for mixing the base particles with the coating solution is by spraying. In some instances, the base particles may be soaked in the coating solution, separated therefrom and then reacted. Multiple coating steps may be used, to obtain a thicker, more dense, more continuous coating. Different metal alkoxides may be used, in different coating steps.

A preferred ratio of coating solution to base particles is about 100 to 1,000 milliliter of coating solution, per 1 kilogram of dried grits. Most preferably, between about 200 and 500 milliliters of coating solution are utilized, per kilogram of base particles. If a particularly slow reacting (to hydrolysis) metal alkoxide is utilized, water and/or catalysts may be added to the coating solution to increase the reaction rate.

In general, if the coating solution and the dried particles are mixed (interactive) for a time period of about 1 minute to 24 hours, a sufficient mixing time for good quality coating and substantial hydrolysis will have been achieved. Generally, an interaction time of about 1 minute to 300 minutes will be appropriate. It has been observed that the longer the coating solution the dried particles are interacted, the thicker the resulting coating will be.

After the coating solution and dried particles have been interacted for a time sufficient to achieve a coating of desired thickness, excess coating solution (non-hydrolyzed and reacted) may be filtered or flushed from the particles. The particle material with the remaining coating solution thereon, even if not fully converted to the metal hydroxides and even though not fully reacted to metal oxide(s), is typically sufficiently converted for the coating not to be readily removed from the particles.

It has been observed that a majority of the coating solution will generally remain on the outer surface of the porous base particles. Some of the coating solution may penetrate into the pores of the base particle by capillary action. However, even when this occurs, it has generally been observed that the coating solution only penetrates to the outermost regions of the base particle and not the inner portions of the pores. That is, penetration does not generally exceed a depth of about 1–2 micrometers.

Following the coating, the base particles are calcined, to achieve substantially complete conversion of the metal hydroxides to the metal oxides. In addition, the organic (alcohol) by-product is volatilized and/or combusted. In general, the coated base particles should be calcined at a temperature between about 400°–1000° C., preferably 400°–800° C. After calcining, the coated base particles are sintered, as described below.

C. Sintering of the Abrasive Grain Precursor

The particles, once coated with the metal oxide coating, comprise a precursor to the alpha-alumina based ceramic abrasive grain. Upon sintering (firing), the coated particles form a unique and improved abrasive grain for use in abrasive products. The sintering, inter alia, generates autogenous bonding between the coating and the sintered base particle. This results in an abrasive grain which is both very hard and appropriately tough, while at the same time has a unique rough outer surface available for excellent adhesion to a bond system of an abrasive article.

The sintering of the grains may be accomplished through a variety of conventional processes. Typically, the sintering will be conducted at a temperature between about 1200° C. and 1650° C., for a sufficient period of time to complete the conversion of the precursor. Although the length of time to which the treated base particle should be exposed to sintering temperatures may be varied depending upon factors such as the precise composition of the treated particle, generally sintering can be accomplished within a time period of a few seconds to about 120 minutes. Sintering of various types of base particles is described in general in U.S. Pat. No. 4,314,827, incorporated herein by reference. The techniques of sintering applied therein may be applied to treated particles as described herein. It is within the scope of this invention to sinter in an oxidizing or a reducing atmosphere.

The sintered base particle (or core) not including reference to the coating, will generally have a relatively high density, typically at least greater than 90%, preferably greater than 95% of theoretical, and most preferably, at least 97% of theoretical. The density of abrasive grain can be readily measured with a helium gas pycnometer, such as one available under the trade designation Micrometeritics Accu-Pyc 1330.

D. Utilization of a Nucleating Agent or Nucleating Agent Precursor

A nucleating agent may be added to the base particles before or during coating formation. Variations in nucleating agent addition may be used to modify the characteristics of the resulting sintered product.

Abrasive Grains

The present invention provides improved abrasive grains. Preferably, the abrasive grains comprise sintered base particle comprising at least 55% by weight aluminum oxide, with a surface coating thereon comprising metal oxide. The metal oxide coating is preferably prepared from hydrolysis/conversion of metal alkoxide(s) as described.

When the coating is prepared according to the processes described herein, generally the coating (where it is present, i.e. in the islands) has a density of at least 80% of theoretical, and typically at least 90% of theoretical, and is autogenously bonded to the surface of the base particle. The coating, upon examination by scanning electron microscope, exhibits thin (in depth or thickness) and broad (in area) "metal oxide islands." The coating does not typically cover the entire surface of the core or sintered base particle material, but rather generally at least about 50% and typically about 60 to 75% thereof. The metal oxide islands are generally random in shape, with the longest dimension of the islands typically being about 5–50 micrometers, most typically and preferably at least about 10 and up to about 30 micrometers. The metal oxide islands are typically less than about 5 micrometers thick. If the preferred process steps outlined above are followed, the islands will generally be less than about 2 micrometers thick.

The size of the metal oxide islands is, in general, a function of the size of droplets of coating solution applied to the particles, during coating. The preferred size ranges given are achievable with the preferred ratio of base particles to coating solution given herein. Preferably and typically, the majority of the metal oxide islands are within the preferred ranges given.

The coating also typically exhibits the presence of spherical metal oxide particles. The spherical metal oxide particles will in some instances be on top of the islands and in other instances will be between the islands. In general, the spherical particles are less than about 5 micrometers in diameter, and most typically less than about 1 micrometer in diameter. Especially when the metal oxide is zirconia, it is believed that the form of the coating with the islands as described, and with the metal oxides spheres present, facilitates inhibition of capping, in stainless steel abrading.

The coating is typically discontinuous, in general the amount of discontinuity depending upon the amount of the coating solution applied to the base particles. To achieve a useful coating, a ratio of about 1 kilogram of base particles to about 50–300 milliliters of coating solution, will be preferred. Alternatively, a very dilute concentration of the metal alkoxide and the coating solution might be utilized, to obtain highly discontinuous coatings. By "dilute concentration" in this context it is meant that a concentration within the range of about 1–30% by weight metal alkoxide in the overall coating, most typically by 1–10%, is used.

Figure 4:
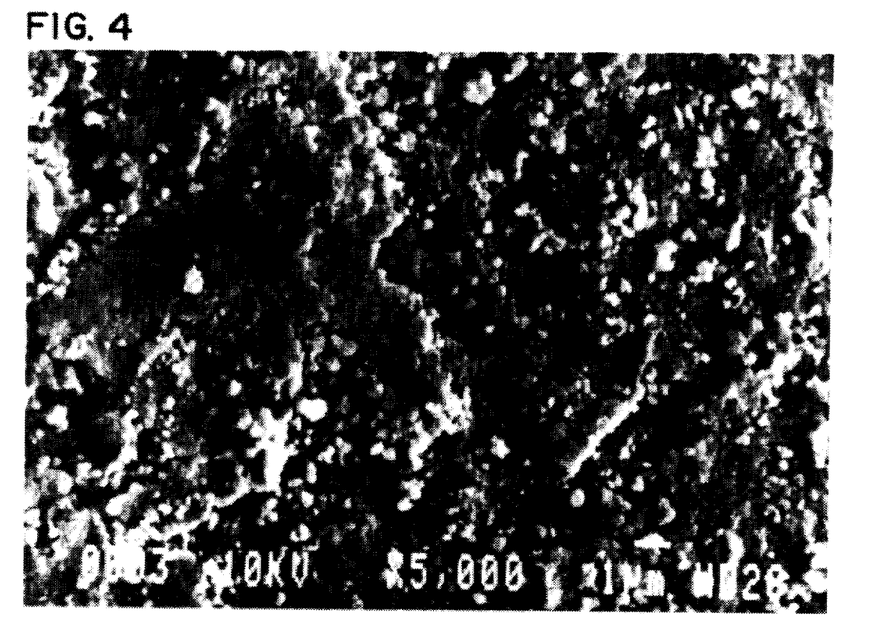
FIG. 4 is a secondary electron photomicrograph of a ceramic abrasive grain prepared according to the principles of the present invention.
Figure 5:
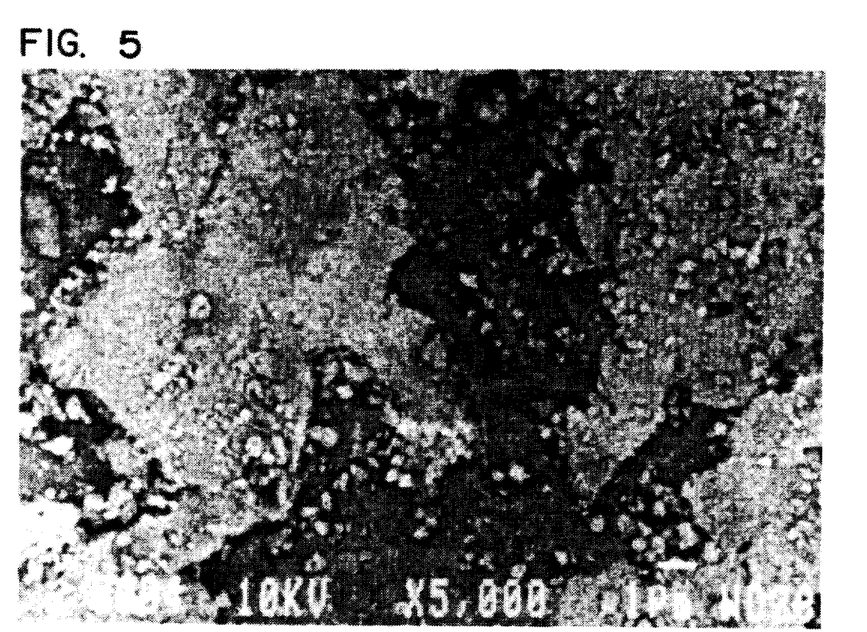
FIG. 5 is a backscattered electron photomicrograph of the same ceramic abrasive grain depicted in FIG. 4.

Attention is now directed to the electron photomicrographs of FIGS. 4 and 5. FIG. 4 is a secondary electron photomicrograph at 4,000 times magnification, and shows the roughness of the grain. FIG. 5 is a backscattered electron photomicrograph, with zirconia islands comprising the light areas and alumina core the darker areas. The particle depicted was made according to Example 1 presented below.

Abrasive Products

The present invention also provides abrasive products including at least a portion of and most preferably its entire abrasive grain content of abrasive grains as described herein.

One type of abrasive product according to the present invention comprises a backing (substrate) with abrasive grains as described herein adhered thereto by a binder. The backing may be any suitable substrate including cloth, polymeric film, fiber, nonwoven web, paper, treated versions thereof or combinations thereof. A variety of inorganic or organic binders could be utilized. The abrasive grains may be applied in one layer or in a plurality of layers. A preferred method of making coated abrasives is described in U.S. Pat. Nos. 4,734,104 and 4,737,163, incorporated herein by reference. In general, coated abrasive products including abrasive grains according to the present invention herein are improved with respect to potential for shelling and longevity.

Figure 1:
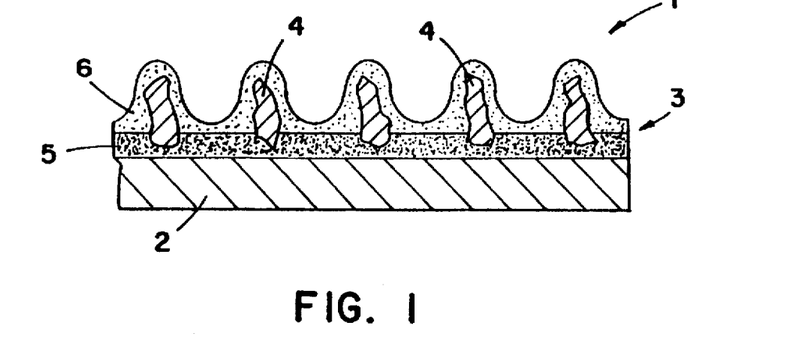
FIG. 1 is fragmentary cross-sectional schematic view of a coated abrasive product including abrasive grains thereon, according to the present invention.

An example of a coated abrasive product is depicted in FIG. 1 at reference numeral 1. Referring thereto, backing 2 has an abrasive layer 3 comprising abrasive grains 4 secured to the backing by make coat 5 and size coat 6.

Figure 2:
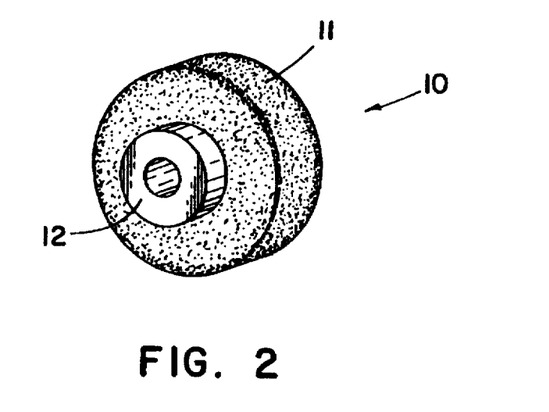
FIG. 2 is a perspective view of a bonded abrasive product including grains therein according to the present invention.

Bonded abrasive products according to the present invention generally comprise shaped masses of abrasive grain as described herein, held together by organic, metallic, or vitrified binder. A particularly common shaped mass for abrasive products is a grinding wheel. In FIG. 2, wheel 10 is depicted, comprising grains 11 molded in a wheel and mounted on hub 12.

Figure 3:
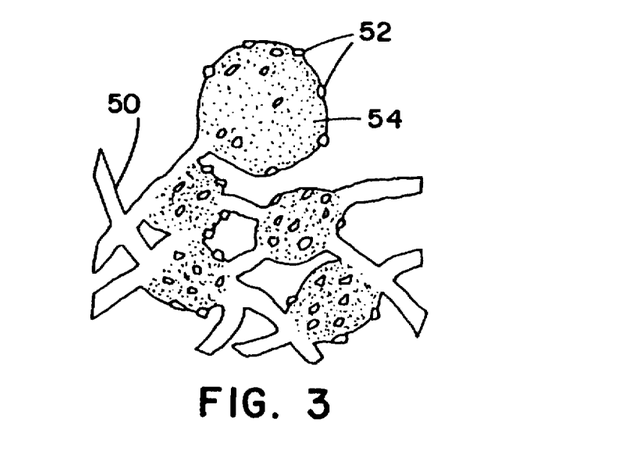
FIG. 3 is an enlarged fragmentary schematic view of a non-woven abrasive product incorporating abrasive grains according to the present invention.

Nonwoven abrasive products incorporating abrasive grains according to the present invention, typically comprise an open porous lofty polymer filament structure (substrate) having the abrasive grains of the invention distributed throughout the fiber structure and bonded therein by an organic binder. Typical fibrous filament structures usable with such constructions comprise polyamides, polyesters and polypropylenes. FIG. 3 depicts an enlarged schematic view at roughly 100× magnification of a typical nonwoven abrasive article. The article comprises a fibrous mat 50, as the substrate, onto which abrasive grains 52 are adhered by binder 54. For further details regarding nonwoven abrasive products see U.S. Pat. No. 2,958,593 (Hoover et al.) the disclosure of which is incorporated herein by reference.

As indicated generally above, abrasive products according to the present invention generally comprise binder and abrasive grains or particles therein. A wide variety of binders may be used in abrasive products according to the present invention, including conventional ones. Useful binders include phenolic, urea-formaldehyde, melamine-formaldehyde, polyester resins, glue, aminoplast resins, epoxy resins, acrylate resins, urethane resins and combinations thereof. The binder may also include inorganic particulate. Such particulates can be grinding aids or fillers. Examples of such grinding aids include cryolite, ammonium cryolite, potassium tetrafluoroborate, polyvinyl chloride, sulfur and sodium chloride. Examples of fillers include calcium carbonate, silica and calcium metasilicate.

Abrasive products or articles according to the present invention may contain, as particulate material therein, 100% abrasive grains which have been improved according to the descriptions herein. In addition, or alternatively, the abrasive articles may contain a blend of abrasive grains according to the present invention With conventional abrasive grains or diluent grains. Conventional abrasive grains usable in this fashion include fused aluminum oxide, silicon carbide, garnet, fused alumina zirconia, diamond, cubic boron nitride and other sol-gel-derived abrasive grains. Diluent grains include marble, gypsum, and glass.

Abrasive grains according to the present invention may be combined with abrasive agglomerates. An example of an abrasive agglomerate is provided in U.S. Pat. No. 4,652,275, the disclosure of which is incorporated herein by reference. Generally, at least 15% by weight, preferably 50% to 100% by weight of the grains of an abrasive product according to the present invention are of improved abrasive grains as described herein.

EXAMPLES

The following non-limiting examples will further illustrate the invention. All parts, percentages, ratios, etc., in the examples are based upon weight unless otherwise indicated. The abrasive grain formulations are based upon weight as calculated by an oxide basis.

For all of the Examples, the abrasive grains were made according to the Procedures outlined below. After the abrasive grains were made, they were employed in a coated abrasive fibre disc which was made according to the procedure detailed below. Next, the resulting coated abrasive disc were tested according to a Test Procedure described below.

General Procedure I For Making the Abrasive Grains

Part A

The following materials were continuously mixed using a high shear mixer to form a dispersion, 1000 parts of room temperature deionized water, 16.5 parts of 16N analytical regent grade nitric acid, 35 parts of 4% aqueous goethite nucleating agent dispersion having a surface area of 200 $m^2/g$ and 350 parts of alpha-alumina oxide monohydrate powder sold under the trade designation Disperal®. The resulting mixture was dispersed at high speed for 3 to 4 minutes using a Giford-Wood Homogenizer Mixer (Greeco Corp., Hudson, N.H.). Next, 12.5 parts of magnesium nitrate was added to the dispersion which resulted in the dispersion gelling. The aqueous magnesia nitrate solution was approximately 11% solids calculated on an oxide basis. The resulting gelled dispersion was continuously dried to increase the solids and then batch dried in a forced air over at 100° C. for about 24 hours to a friable solid. The resulting dried material was crushed to form particles that were between 0.125 to 1 mm in size.

Part B

The particles were then coated with a coating solution containing a metal alkoxide. The coating procedure used is described in each example.

Part C

The resulting particles were fed into a rotary kiln to form calcined particles. The rotary kiln was a 15 cm diameter 1.2 meter long stainless steel tube having a 0.6 meter hot zone. The tube was inclined at a 2.4 degree angle with respect to the horizontal. The tube rotated at about 50 rpm, to provide a residence time within the tube of about 4 to 5 minutes. The rotary kiln had a hot zone temperature of 650° C. Next, the calcined particles were fed into a second rotary film with a heat zone of about 1400° C. The 1400° C. rotary kiln was a 8.0 cm diameter, 1.32 meter long silicon carbide tube inclined at 4.4 degrees with respect to the horizontal and had a 76 cm hot zone. The kiln rotated to 6 rpm, to provide a residence time in the kiln of about 5 minutes. The product exited the kiln into room temperature air where it was collected in a metal container and allowed to cool to room temperature.

General Procedure for Making the Coated Abrasive Disc

The abrasive grains were incorporated into coated abrasive products using conventional coated abrasive making procedures. The abrasive grains were screened such that 50% by weight of the abrasive grains passed through a 25 mesh U.S. standard screen, but remained on a 30 mesh U.S. standard screen. The remaining 50% were abrasive grains that passed through a 30 mesh U.S. standard screen, but were retained on a 35 mesh U.S. standard screen. The abrasive grains were bonded to vulcanized fibre backing using conventional calcium carbonate filled phenolic make resin and conventional cryolite filled phenolic size resins. The make resin was precured for 90 minutes at 88° C. and the size resin was precured for 90 minutes at 88° C. followed by a final cure of 10 hours at 100° C. The abrasive grains were electrostatically coated on the resin coated backing.

Test Procedure I

Test Procedure I was designed to measure the time it took for the abrasive grain to shell from a coated abrasive disc. The test equipment included 17.8 cm diameter test coated abrasive disc with 2.2 cm mounting hole attached to a 16.5 cm diameter 1.57 mm thick hard phenolic backup pad which was in turn mounted on a 15.2 diameter steel flange. The test disc so supported was rotated counterclockwise at 3550 rpm. The 1.8 mm peripheral edge of a 25 cm diameter 1018 carbon steel disc shaped workpiece deployed 18.5° from a position normal to the abrasive disc and rotated counter clockwise at 2 rpm, was placed into contact with the abrasive face of the abrasive disc under a load of 2.9 kg. The test endpoint was 20 minutes or when the disc began to shell, i.e., a substantial portion of its abrasive grain were ejected from the discs, whichever occurred first. At the end of the test, the workpiece was weighed to determine the amount of metal cut (abraded) from the workpiece.

Test Procedure II

The coated abrasive disc was mounted on a beveled aluminum back-up pad, and used to grind the face of a 1.25 cm by 18 cm 304 stainless steel workpiece. The disc was driven at 5,500 rpm while the portion of the disc overlaying the beveled edge of the back-up pad contacted the workpiece at about a 6 kg load. Each disc was used to grind a separate workpiece for a one minute interval for a total time of 12 minutes. The initial cut was the amount of metal removed in the first minute of grinding. Likewise the final cut was the amount of metal removed in the last minutes of grinding and the total cut was the summation of the amount removed throughout the test. There were approximately four discs per Example tested.

Example 1 and Comparative Example A

This set of examples compared the abrading performance of a coated abrasive fibre disc containing an abrasive grain with a zirconia coating and one without a zirconia coating. The coated abrasive discs were tested according to Test Procedure I and the test results are reported in Table 1, below. The fibre discs were humidified for one week at 30% relative humidity prior to testing. The base particle for both examples consisted of 99% by weight alpha-alumina, 0.5% iron oxide and 0.5% magnesia.

The abrasive grain for Example 1 was made according to General Procedure I for Making the Abrasive Grain, Parts A through C. The coating solution consisted of 20 grams of zirconyl-n-propoxide and 250 grams of ethanol. An aerosol of this coating solution was created by a detergent sprayer and sprayed onto 0.45 kilogram of the dried particles from part A.

The abrasive grain for Comparative Example A was made according to General Procedure I for Making the Abrasive Grain, Parts A and C only.

TABLE I

| Test Procedure I | |
| --- | --- |
| Example | Total cut (grams) |
| 1 | 272 |
| Comparative A | 167 |

Examples 2 through 4 and Comparative Example B

This set of examples compared the abrading performance of a coated abrasive fibre disc containing in abrasive grain with zirconia coatings and one without a zirconia coating. The coated abrasive discs were tested according to Test Procedure II and the test results can be found in Table 2, below. The base particle for both examples consisted of 99% by weight alpha-alumina, 0.5% iron oxide and 0.5 magnesia.

The abrasive grain for Examples 2 through 4 were made according to General Procedure I for Making the Abrasive Grain, Parts A through C. An aerosol of this coating solution was created by use of a detergent sprayer and sprayed onto one kilogram of the dried particles from part A. For Example 2, the coating solution consisted of 25 grams of zirconyl-n-propoxide mixed with enough heptane to make a molar solution of 250 grams. For Example 3, the coating solution consisted of 50 grams of zirconyl-n-propoxide mixed with enough heptane to make a molar solution of 250 gram. For Example 4, the coating solution consisted of 75 grams of zirconyl-n-propoxide mixed with enough heptane to make a molar solution of 250 grams. Comparative B was prepared as described above in Example 1 for Comparative A.

TABLE 2

| | Test Procedure II | | |
|---|---|---|---|
| Example | Initial Cut (grams) | Final Cut (grams) | Total Cut (grams) |
| 2 | 32.4 | 8.4 | 140 |
| 3 | 32.2 | 8.6 | 149.2 |
| 4 | 30.8 | 7.8 | 140.9 |
| Comparative B | 26.2 | 7.4 | 117.7 |

Various modifications and alterations of this invention will become apparent to those skilled in the art and it should be understood that this invention is not to be unduly limited to the illustrative embodiments set forth herein.

What is claimed is:

1. A method of making ceramic abrasive grain, said method comprising the steps of:
   (a) providing a mass of particles comprising alpha-alumina precursor material each particle of which is sinterable to an alpha-alumina-based abrasive particle of said abrasive grain;
   (b) coating said particles with a coating composition comprising metal alkoxide to provide coated particles, said coating being capable of converting to a metal oxide coating which is autogenously bonded to the surface of each of said particles upon heating; and
   (c) heating said coated particles under conditions which convert said coating to a metal oxide coating and sinter said particles to provide alpha alumina-based particles.

2. A method according to claim 1 wherein said coating composition also includes metal oxide modifier precursor.

3. A method according to claim 2 wherein said metal oxide modifier precursor is selected from the group consisting of salts of: magnesium; zinc; cobalt; iron; nickel; zirconium; manganese; silicon; hafnium; chromium; yttrium; praseodymium; samarium; ytterbium; neodymium; lanthanum; gadolinium; cerium; dysprosium; erbium; titanium; and mixtures of two or more thereof.

4. The method according to claim 1 wherein said metal alkoxide is selected from the group consisting of one or more alkoxides of: zirconium; titanium; aluminum; magnesium; zinc; cobalt; nickel; silicon; hafnium; iron; manganese; chromium; yttrium; praseodymium; samarium; ytterbium; neodymium; lanthanum; gadolinium; cerium; dysprosium; erbium; and mixtures of two or more thereof.

5. The method according to claim 1 wherein said metal alkoxide has a general Formula I as follows:

Formula I $Z_xM(OR)_{n-x}$ wherein:

M is a multivalent metal cation;

n is the oxidation state of M;

x is an integer having a value of 0 to n–1;

OR is an alkoxy group, wherein O is oxygen; each R group is an alkyl group; and, each Z group is independently an organic group or inorganic group.

6. A method according to claim 5 wherein said metal alkoxide comprises material wherein n–x is within the range of 2–6.

7. A method according to claim 5 wherein each R group is independently a linear or branched organic group of 1 to 20 carbon atoms.

8. A method according to claim 5 wherein

M is a metal cation selected from cations of metals in the group consisting of: zirconium; titanium; aluminum; magnesium; zinc; cobalt; nickel; silicon; hafnium; iron; manganese; chromium; yttrium; praseodymium; samarium; ytterbium; neodymium; lanthanum; gadolinium; cerium; dysprosium; erbium; and mixtures of two or more thereof.

9. A method according to claim 1 wherein said step of coating comprises spraying the metal alkoxide-containing coating onto said particles.

10. A method according to claim wherein step (c) includes:

(i) hydrolyzing said metal alkoxide coating to a coating of metal hydroxide; and
   (ii) heating said coating of metal hydroxide to a temperature of at least 400° C.

11. A method according to claim 1 wherein each of said particles has an outer surface, and said steps of coating and heating provides sintered coated particle particles with metal oxide coating covering at least 50% of said outer surface area.

12. A method according to claim 1 wherein said coating composition further comprises a non-polar organic solvent.

13. Ceramic abrasive grain made according to the process of claim 1.

14. Ceramic abrasive grain comprising a plurality of sintered particles, each particle comprising:
   (i) an alpha-alumina-based core; and,
   (ii) a metal oxide coating autogenously bonded to said alpha-alumina-based core; said metal oxide coating comprising randomly shaped metal oxide islands each island of which being at least about 10 micrometers in length and less than about 5 micrometers in thickness.

15. Ceramic abrasive grain according to claim 14 including a plurality of metal oxide spheres autogenously bonded to said alpha-alumina-based core.

16. Ceramic abrasive grain according to claim 14 including a plurality of metal oxide spheres bonded to said metal oxide islands.

17. An abrasive product comprising:
   (a) a binder; and
   (b) the abrasive grain of claim 14.

18. An abrasive product according to claim 17 including a substrate to which said abrasive grain is bound by said binder.

* * * * *

UNITED STATES PATENT AND TRADEMARK OFFICE
CERTIFICATE OF CORRECTION

PATENT NO. : 5,474,583
DATED : December 12, 1995
INVENTOR(S) : Celikkaya

It is certified that error appears in the above-indentified patent and that said Letters Patent is hereby corrected as shown below:

Column 8, line 21, "substituent-reactive" should read --substituent reactive--.

Column 9, line 67, "inter alia," should read --inter alia,--.

Column 14, line 52, "in" should read --an--.

Column 16, line 23, "claim wherein" should read --claim 1 wherein--.

Signed and Sealed this

Twenty-second Day of July, 1997

Attest:

BRUCE LEHMAN

Attesting Officer

Commissioner of Patents and Trademarks